(12) United States Patent
Miyata

(10) Patent No.: US 11,743,594 B2
(45) Date of Patent: Aug. 29, 2023

(54) SHUTTER CONTROL DEVICE, SHUTTER UNIT, IMAGING APPARATUS, SHUTTER CONTROL METHOD, AND SHUTTER CONTROL PROGRAM

(71) Applicant: FUJIFILM Corporation, Tokyo (JP)

(72) Inventor: Masahiko Miyata, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/729,749

(22) Filed: Apr. 26, 2022

(65) Prior Publication Data

US 2022/0256069 A1     Aug. 11, 2022

Related U.S. Application Data

(63) Continuation of application No. PCT/JP2020/044208, filed on Nov. 27, 2020.

(30) Foreign Application Priority Data

Nov. 29, 2019   (JP) ................... 2019-217409

(51) Int. Cl.
  *H04N 23/73*    (2023.01)
  *G03B 9/58*     (2021.01)
  *G03B 7/22*     (2021.01)
(52) U.S. Cl.
  CPC ............... *H04N 23/73* (2023.01); *G03B 7/22* (2013.01)
(58) Field of Classification Search
  CPC ........ H04N 23/73; H04N 23/00; H04N 23/75; G03B 7/22; G03B 9/58; G03B 9/64; G03B 30/00
  See application file for complete search history.

(56) References Cited

U.S. PATENT DOCUMENTS

| 7,753,601 B2 * | 7/2010 | Sakai ..................... H04N 23/63 396/479 |
| 7,848,631 B2 * | 12/2010 | Kawashima ........... H04N 23/73 396/231 |
| 2014/0104809 A1 | 4/2014 | Shum |

FOREIGN PATENT DOCUMENTS

| JP | 2006-323078 A | 11/2006 |
| JP | 2009-098477 A | 5/2009 |

(Continued)

OTHER PUBLICATIONS

An Office Action; "Notice of Reasons for Refusal," mailed by the Japanese Patent Office dated Mar. 28, 2023, which corresponds to Japanese Patent Application No. 2021-561539 and is related to U.S. Appl. No. 17/729,749; with English language translation.

(Continued)

*Primary Examiner* — Ahmed A Berhan
(74) *Attorney, Agent, or Firm* — Studebaker & Brackett PC

(57) ABSTRACT

A shutter control device that controls a drive device for a mechanical shutter included in an imaging apparatus, includes: a processor configured to control a drive interval of the mechanical shutter in a case where the mechanical shutter is continuously driven by the drive device, and the processor is configured to: set, as a first time, a drive interval of the mechanical shutter at which a temperature of the drive device is made to be saturable at a saturation temperature lower than an allowable upper limit temperature in a case where the mechanical shutter is continuously driven by the drive device; and control a drive interval of the mechanical shutter based on a comparison between an elapsed time from a reference timing and a number of times of the mechanical shutter being driven during the elapsed time, the elapsed time being calculated by a unit of the first time.

21 Claims, 5 Drawing Sheets

(56) References Cited

FOREIGN PATENT DOCUMENTS

| | | | | |
|---|---|---|---|---|
| JP | 2010-190922 | A | | 9/2010 |
| JP | 2010190922 | A | * | 9/2010 |
| JP | 2014-077962 | A | | 5/2014 |

OTHER PUBLICATIONS

International Search Report issued in PCT/JP2020/044208; dated Feb. 2, 2021.
Written Opinion of the International Searching Authority issued in PCT/JP2020/044208; dated Feb. 2, 2021.

* cited by examiner

SHUTTER CONTROL DEVICE, SHUTTER UNIT, IMAGING APPARATUS, SHUTTER CONTROL METHOD, AND SHUTTER CONTROL PROGRAM

CROSS REFERENCE TO RELATED APPLICATION

This is a continuation of International Application No. PCT/JP2020/044208 filed on Nov. 27, 2020, and claims priority from Japanese Patent Application No. 2019-217409 filed on Nov. 29, 2019, the entire disclosures of which are incorporated herein by reference.

BACKGROUND OF THE INVENTION

1. Field of the Invention

The present invention relates to a shutter control device, a shutter unit, an imaging apparatus, a shutter control method, and a computer readable medium storing a shutter control program.

2. Description of the Related Art

In an electronic apparatus (hereinafter, described as an imaging apparatus) with an imaging function, such as a smartphone or a digital camera, a large number of electric components are mounted. For this reason, there is a demand for suppressing a temperature increase inside the device. For example, in a case where a current continuously flows in a coil of an electromagnetic actuator that opens and closes a mechanical shutter mounted in an imaging apparatus, a temperature of the coil increases. For this reason, there is a demand for suppressing an increase in temperature of the coil more than necessary.

JP2010-190922A described an imaging apparatus that detects a temperature around a drive unit of a mechanical shutter with a temperature sensor, and in a case where the temperature reaches a temperature close to a breakdown temperature in a case where the drive unit is thermally broken, stops the drive of the shutter by the drive unit.

JP2006-323078A describes a camera that performs continuous shooting while a release button is pressed, and in a case where a continuous shooting time can be set, and the continuous shooting time elapses from a start of continuous shooting, ends continuous shooting (stops drive of a shutter) even though the release button is pressed.

SUMMARY OF THE INVENTION

An object of an example of the present invention is to provide a shutter control device, a shutter unit, an imaging apparatus, a shutter control method, and a computer readable medium storing a shutter control program capable of suppressing a temperature increase of a drive device for a mechanical shutter.

A shutter control device of an example of the present invention is a shutter control device that controls a drive device for a mechanical shutter included in an imaging apparatus, and comprises a processor that sets, as a first time, a value determined based on characteristics of the drive device and an allowable upper limit temperature of the drive device among drive intervals of the mechanical shutter in a case where the mechanical shutter is continuously driven with the drive device and controls a drive interval of the mechanical shutter based on information regarding the first time and an elapsed time from a reference timing.

A shutter unit of an example of the present invention comprises the above-described shutter control device and the above-described mechanical shutter.

An imaging apparatus of an example of the present invention comprises the above-described shutter control device.

A shutter control method of an example of the present invention is a shutter control method that controls a drive device for a mechanical shutter included in an imaging apparatus and comprises a control step of setting, as a first time, a value determined based on characteristics of the drive device and an allowable upper limit temperature of the drive device among drive intervals of the mechanical shutter in a case where the mechanical shutter is continuously driven with the drive device and controlling a drive interval of the mechanical shutter based on information regarding the first time and an elapsed time from a reference timing.

A shutter control program of an example of the present invention is a shutter control program that controls a drive device for a mechanical shutter included in an imaging apparatus, and causes a computer to execute a control step of setting, as a first time, a value determined based on characteristics of the drive device and an allowable upper limit temperature of the drive device among drive intervals of the mechanical shutter in a case where the mechanical shutter is continuously driven with the drive device and controlling a drive interval of the mechanical shutter based on information regarding the first time and an elapsed time from a reference timing.

DESCRIPTION OF THE PREFERRED EMBODIMENTS

As described in JP2010-190922A, the method using the temperature sensor has disadvantages in terms of a reduction in size or a reduction in cost of the imaging apparatus. Furthermore, a case where the temperature sensor may not respond to a sharp temperature increase due to positions of the temperature sensor and a heat source, a problem in the performance of the temperature sensor, or the like is considered.

For example, as a drive unit of the mechanical shutter, there are known a moving magnet type electromagnetic motor in which a position of a coil to be a heat generation part is fixed and a magnet that forms a magnetic field moves on an inner peripheral portion of the coil, and a moving coil type electromagnetic motor in which a position of a magnet is fixed and a coil moves on an inner peripheral portion of the magnet.

In the moving coil type electromagnetic motor, since the coil and the magnetic are disposed close to each other, and the coil is movable, it is hard to provide the temperature sensor near the coil. In the moving magnet type electromagnetic motor, while the temperature sensor can be provided near the coil, the temperature sensor is provided at a position separated from a portion of the coil where heat is most intensely generated. Accordingly, even in any case, it is hard to detect a temperature change of the coil with the temperature sensor without delay.

JP2006-323078A does not suppose suppression of a temperature increase of the drive unit for the mechanical shutter. Hereinafter, an embodiment that enables to suppress a temperature increase of a drive unit for a mechanical shutter with a simple configuration will be described.

Figure 1:
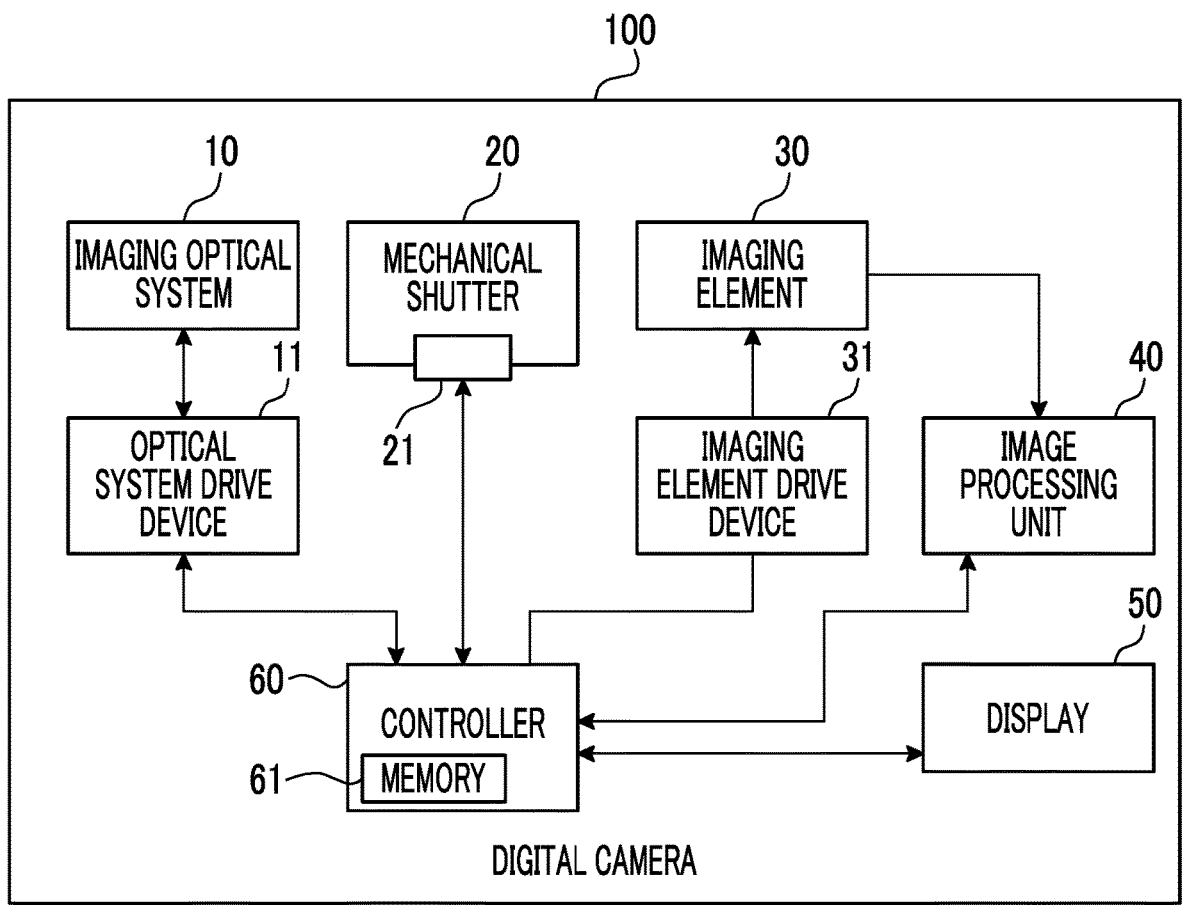
FIG. 1 is a block diagram showing the schematic configuration of a digital camera 100 that is an embodiment of an imaging apparatus of the present invention.

FIG. 1 is a block diagram showing the schematic configuration of a digital camera 100 that is an embodiment of an imaging apparatus of the present invention. The digital camera 100 comprises an imaging optical system 10, an optical system drive device 11, a mechanical shutter 20, a shutter drive device 21 that configures a drive device, an imaging element 30, an imaging element drive device 31, an image processing unit 40, a display 50 including a liquid crystal display panel, an organic electroluminescence (EL) display panel, or the like, and a controller 60.

The imaging optical system 10 includes a lens group including a focus lens for focusing on a subject and a zoom lens for adjusting a focal length, and a stop for adjusting an amount of light reaching the imaging element 30.

The optical system drive device 11 is an actuator, such as motors that drive the focus lens, the zoom lens, and the stop included in the imaging optical system 10. The optical system drive device 11 is controlled by the controller 60.

The imaging element 30 is an element that images the subject through the imaging optical system 10 and outputs the captured image as a captured image signal, and is configured of a complementary metal-oxide-semiconductor (CMOS) image sensor, a charge coupled device (CCD) image sensor, or the like. The captured image signal output from the imaging element 30 is transmitted to the image processing unit 40.

The imaging element drive device 31 drives the imaging element 30 to image the subject under the control of the controller 60.

The image processing unit 40 processes the captured image signal received from the imaging element 30 to generate captured image data, for example, in a joint photographic experts group (JPEG) format. The captured image data is displayed on the display 50 or is stored in a storage medium (not shown) under the control of the controller 60.

The mechanical shutter 20 is disposed between the imaging optical system 10 and the imaging element 30 in the example of FIG. 1, and is provided to control an exposure time of the imaging element 30. The mechanical shutter 20 is specifically configured of a focal-plane shutter. The mechanical shutter 20 may be included inside the imaging optical system 10. In this case, the mechanical shutter 20 is specifically configured of a lens shutter.

The mechanical shutter 20 comprises a member, such as a plate for shielding light or a stop leaf blade, and a shutter drive device 21 that is an actuator for moving the member. As the shutter drive device 21, for example, a moving magnet type electromagnetic motor or a moving coil type electromagnetic motor is used. The shutter drive device 21 is controlled by the controller 60.

The controller 60 comprises a processing unit that executes various kinds of processing, and a memory 61 including a random access memory (RAM) and a read only memory (ROM). The hardware structure of the processing unit is various processors described below. Various processors include a central processing unit (CPU) that is a general-purpose processor configured to execute software (program) to execute various kinds of processing, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

The processing unit of the controller 60 may be configured of one of various processors described above or may be configured of a combination of two or more processors (for example, a plurality of FPGAs or a combination of a CPU and an FPGA) of the same type or different types. In this way, the processing unit of the controller 60 may be configured using one or more processors among various processors described above as a hardware structure. In addition, the hardware structure of various processors described above is, more specifically, an electric circuit (circuitry), in which circuit elements, such as semiconductor elements, are combined.

The processing unit of the controller 60 executes programs including a shutter control program stored in the ROM of the memory 61, thereby functioning as a shutter control device. The processing unit of the controller 60 and the mechanical shutter 20 configure a shutter unit. The digital camera 100 configures an apparatus including the shutter control device.

The digital camera 100 has a continuous shooting mode where imaging with the exposure time controlled with the mechanical shutter 20 is continuously performed multiple times. In a state where the continuous shooting mode is set, in a case where a shutter button (not shown) is pressed and an instruction of an imaging start is performed, the processing unit of the controller 60 starts the imaging of the subject at a continuous shooting speed set from a user or a continuous shooting speed automatically set depending on a scene or the like.

The continuous shooting speed is the number of times of imaging of the subject per unit time. For example, in a case where imaging is performed 30 times a second, a time (a drive interval of the mechanical shutter 20) from a point in time at which the drive of the mechanical shutter 20 is started for exposure control in any imaging frame to a point in time at which the drive of the mechanical shutter 20 is started for exposure control in an imaging frame next to the imaging frame is 1/30 seconds. That is, in the continuous shooting mode, the drive interval of the mechanical shutter 20 is controlled to a value depending on the continuous shooting speed.

In the ROM of the memory 61, any one of values that can be set as the drive interval of the mechanical shutter 20, and specifically, information regarding a value (hereinafter, described as a first time T1) determined based on characteristics of the shutter drive device 21 and an allowable upper limit temperature Tg of the shutter drive device 21 is stored.

The characteristics of the shutter drive device 21 refer to a heat generation characteristic and a heat release characteristic of a heat generating part (for example, a coil) of the shutter drive device 21 in a state where an environmental temperature at which the shutter drive device 21 is placed is an expected maximum environmental temperature. The allowable upper limit temperature Tg of the shutter drive device 21 refers to an upper limit value of an operation guarantee temperature of the shutter drive device 21.

The first time T1 is, more specifically, the drive interval of the mechanical shutter 20 at which the temperature of the shutter drive device 21 can be saturated at a saturation temperature Ts lower than the allowable upper limit temperature Tg in a case where the mechanical shutter 20 is continuously driven with the shutter drive device 21.

Figure 2:
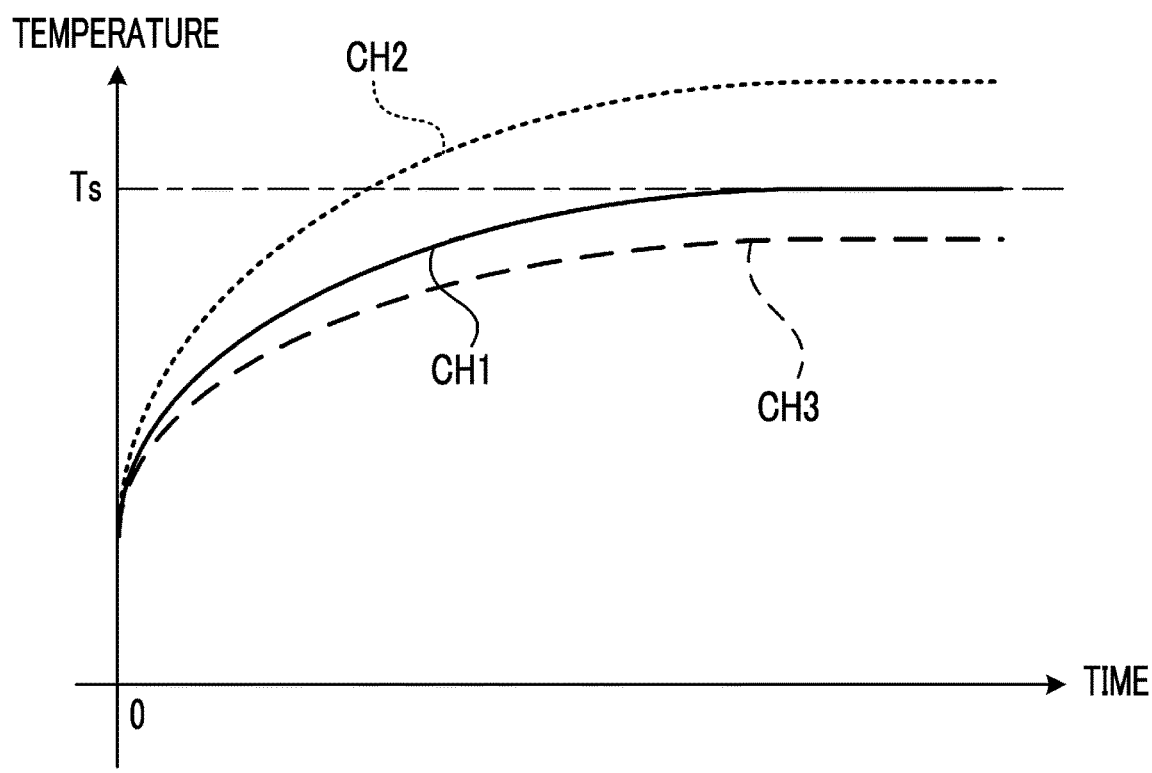
FIG. 2 is a diagram showing an example of a temperature change of a shutter drive device 21 in a case where a mechanical shutter 20 is continuously driven at three drive intervals in a state in which the digital camera 100 is under an expected maximum environmental temperature.

FIG. 2 is a diagram showing an example of a temperature change of the shutter drive device 21 in a case where the mechanical shutter 20 is continuously driven at three drive intervals in a state in which the digital camera 100 is under the expected maximum environmental temperature.

A temperature change CH1 shown in FIG. 2 shows a temperature change of the shutter drive device 21 in a case where the drive interval is the first time T1. A temperature change CH2 shown in FIG. 2 shows a temperature change of the shutter drive device 21 in a case where the drive interval is a second time T2 shorter than the first time T1. A temperature change CH3 shown in FIG. 2 shows a temperature change of the shutter drive device 21 in a case where the drive interval is a third time T3 longer than the first time T1. Such temperature changes can be obtained by a measurement or a simulation.

An element to be electrically conducted (for example, a coil) consisting of a conductive member included in the shutter drive device 21 increases in temperature with electrical conduction each time the drive of the mechanical shutter 20 is executed in a case where the mechanical shutter 20 is continuously driven at the drive interval of the first time T1. Note that, in a case where the temperature of the conductive member is brought into a state of being high to some extent, a heat generation amount and a heat release amount are brought into a balanced state. For this reason, as long as the mechanical shutter 20 is continuously driven at the drive interval of the first time T1, the temperature of the shutter drive device 21 does not exceed the saturation temperature Ts.

In a case where the mechanical shutter 20 is continuously driven at a drive interval longer than the first time T1, as shown in the temperature change CH3, the temperature of the shutter drive device 21 is saturated at a temperature lower than the saturation temperature Ts. On the other hand, in a case where the mechanical shutter 20 is continuously driven at a drive interval shorter than the first time T1, as shown in the temperature change CH2, the temperature of the shutter drive device 21 increases to a temperature higher than the saturation temperature Ts.

That is, in a case where the drive interval of the mechanical shutter 20 is limited to the first time T1 or more, even under the expected maximum environmental temperature, it is possible to control the temperature of the shutter drive device 21 to the saturation temperature Ts or less, and to increase the durability of the shutter drive device 21. Note that, in the digital camera 100, a value shorter than the first time T1 can be set as the drive interval. For this reason, in a case where the mechanical shutter 20 is driven at a drive interval shorter than the first time T1, there is a need to control the drive interval of the mechanical shutter 20 such that the temperature of the shutter drive device 21 is not maintained at the allowable upper limit temperature Tg. Hereinafter, details of a control method of the drive interval will be described.

The processing unit of the controller 60 incorporates a counter. The counter has zero as an initial value and a minimum value of a count value, and the count value is not minus. Then, the processing unit of the controller 60 enables the execution of the drive of the mechanical shutter 20 through the shutter drive device 21 in a case where the count value of the counter is "1" or more.

The processing unit of the controller 60 sets a timing at which the digital camera 100 is powered on and the digital camera 100 is started, as a reference timing, and executes first count processing of increasing the count value of the counter in a case where a predetermined time has elapsed from the reference timing and second count processing of decreasing the count value of the counter in a case where the drive of the mechanical shutter 20 is executed.

The first count processing is specifically processing of increasing the count value of the counter by "N" that is a natural number equal to or greater than 1 in a case where a time of N times the first time T1 has elapsed from the reference timing. The second count processing is processing of decreasing the count value of the counter by "1" in a case where the shutter drive device 21 operates to execute the drive of the mechanical shutter 20 once.

The processing unit of the controller 60 limits the drive interval of the mechanical shutter 20 to a time equal to or more than the first time T1 in a state in which the count value of the counter is a default value (for example, the above-described initial value (=zero)), and does not limit the drive interval of the mechanical shutter 20 and enables the execution of the drive of the mechanical shutter 20 at each settable drive interval in a state in which the count value of the counter exceeds the default value. With such processing, the temperature of the shutter drive device 21 is restrained from being maintained at the allowable upper limit temperature Tg for a long time. The "time equal to or more than the first time T1" to which the drive interval is limited in a state in which the count value is the default value includes infinite. This case means that the drive of the mechanical shutter 20 is inhibited.

Figure 3:
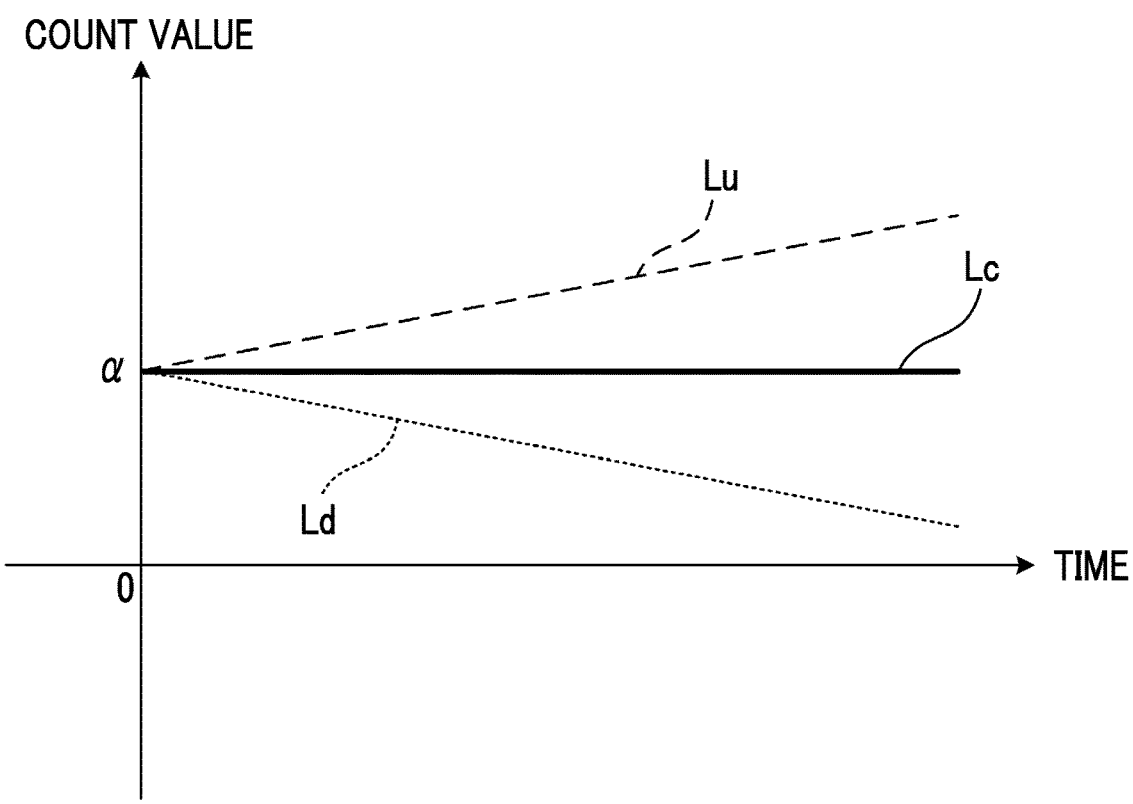
FIG. 3 is a diagram showing an example of change in count value of a counter incorporated in a processing unit of a controller 60.

FIG. 3 is a diagram showing an example of change in counter value of the counter incorporated in the processing unit of the controller 60. FIG. 3 shows, as an example, a case where the reference timing is set to a time=0, the count value at the reference timing is set to "α" that is a value equal to or greater than 0, and each time the first time T1 elapses from the reference timing, the drive of the mechanical shutter 20 is executed (that is, the drive of the mechanical shutter 20 is executed at the drive interval of the first time T1).

A straight line Lu shown in FIG. 3 shows change in count value in a case where the count value increases by "1" each time the first time T1 elapses from the reference timing. A straight line Ld shown in FIG. 3 shows change in count value in a case where the count value decreases by "1" each time the first time T1 elapses from the reference timing.

In the example of FIG. 3, in a case where the first time T1 elapses from the reference timing, while the count value increases by "1" with the elapse of time, the count value decreases by "1" with the execution of the drive of the mechanical shutter 20. That is, as shown in a straight line Lc, the count value does not decrease. In this way, as long as the drive of the mechanical shutter 20 is executed at the drive interval of the first time T1, since there is no fluctuation of the count value, the drive can be executed endlessly. In a case where the drive of the mechanical shutter 20 is executed at a drive interval equal to or more than the first time T1, since the count value increases reversely, similarly, the drive can be executed endlessly. In this way, even though the mechanical shutter 20 is continuously driven at the drive interval equal to or more than the first time T1 endlessly, as shown in FIG. 2, it is possible to keep the temperature of the shutter drive device 21 at the saturation temperature Ts, and to protect the shutter drive device 21.

Figure 4:
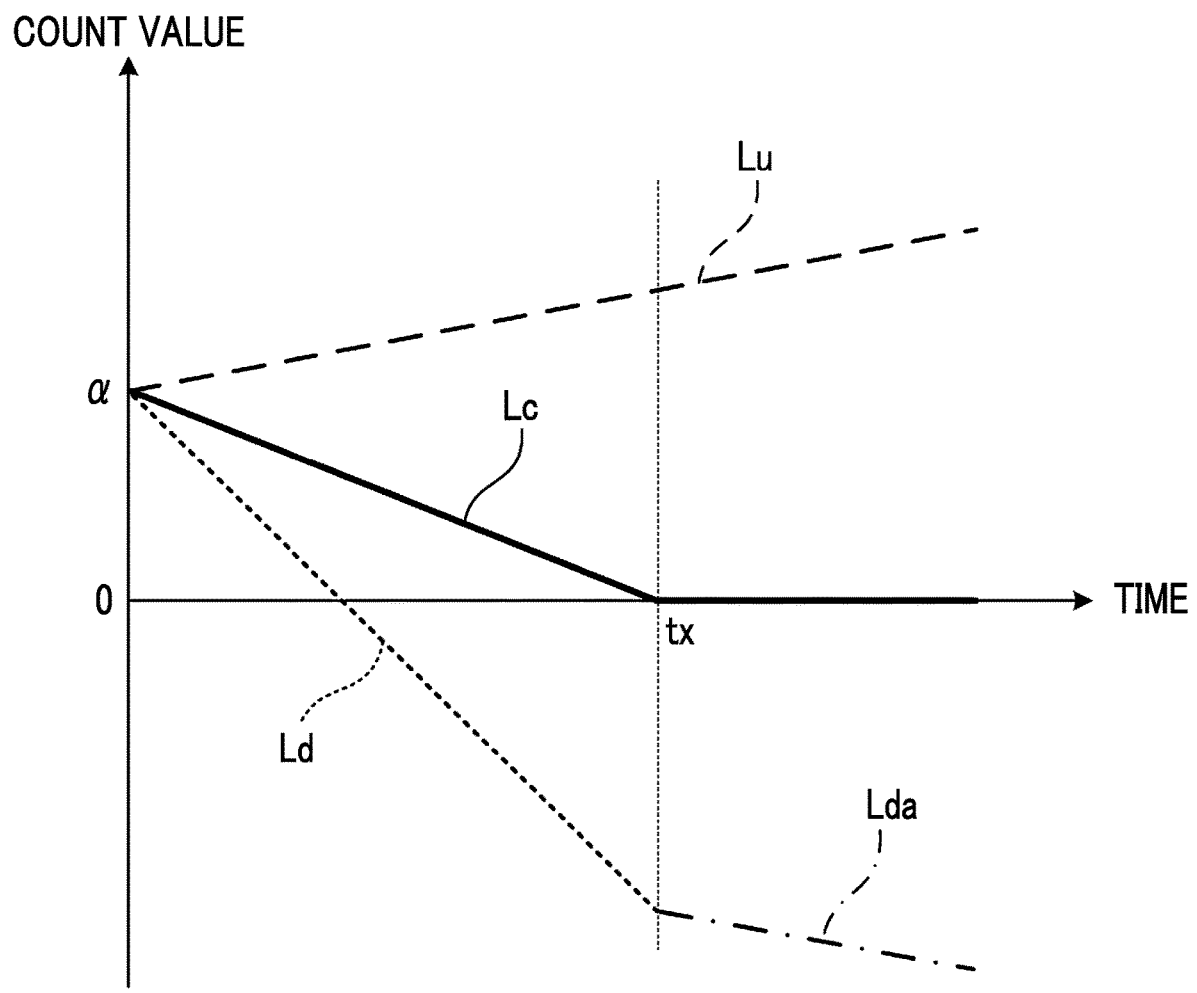
FIG. 4 is a diagram showing an example of change in counter value of the counter incorporated in the processing unit of the controller 60.

FIG. 4 is a diagram showing an example of change in counter value of the counter incorporated in the processing unit of the controller 60. FIG. 4 shows, as an example, a case where the reference timing is set to a time=0, the count value at the reference timing is set to "α" that is a value equal to or greater than 1, and each time the second time T2 elapses from the reference timing, the drive of the mechanical shutter 20 is executed (that is, the drive of the mechanical shutter 20 is executed at the drive interval of the second time T2). The second time T2 is, for example, ½ of the first time T1.

A straight line Lu shown in FIG. 4 shows change in count value in a case where the count value increases by "1" each time the first time T1 elapses from the reference timing. A straight line Ld shown in FIG. 4 shows change in count value in a case where the count value decreases by "1" each time the second time T2 elapses from the reference timing. Although the count value is not minus, for convenience, the straight line Ld shows that the count value is minus.

In the example of FIG. 4, in a case where the second time T2 elapses from the reference timing and the drive of the mechanical shutter 20 is executed, the count value decreases by "1" with the execution of the drive of the mechanical shutter 20. Thereafter, in a case where the second time T2 further elapses, while the count value increases by "1" with the elapses of the first time T1 that is a value of two times the second time T2, the count value decreases by "1" with the execution of the drive of the mechanical shutter 20. Accordingly, in a case where the drive of the mechanical shutter 20 with the second time T2 as the drive interval is continued, the count value decreases as shown in a straight line Lc, and the count value is zero at a point in time at which a timing tx of FIG. 4 is reached.

In a case where the count value is zero, the processing unit of the controller 60 changes the drive interval of the mechanical shutter 20 from the second time T2 to a time (in the example of FIG. 4, the first time T1) equal to or more than the first time T1. With this change, as shown in a straight line Lda, a decrease speed of the count value is equal to an increase speed of the count value. That is, each time the first time T1 elapses from the timing tx, while the count value increases by "1", the count value decreases by "1" with the execution of the drive of the mechanical shutter 20. For this reason, the drive of the mechanical shutter 20 at the first time T1 is continued. In this way, until the count value reaches the default value (zero), the drive of the mechanical shutter 20 at the drive interval shorter than the first time T1 is enabled, whereby imaging at a higher continuous shooting speed can be performed.

An upper limit value CL is set for the count value of the counter incorporated in the processing unit of the controller 60, whereby it is possible to protect the shutter drive device 21 even in a case where the drive of the mechanical shutter 20 is executed at a drive interval of a time shorter than the first time T1.

The upper limit value CL is a value obtained by adding the number of times of the drive of the mechanical shutter 20 needed to increasing the temperature of the shutter drive device 21 from the saturation temperature Ts to the allowable upper limit temperature Tg in a case where the drive of the mechanical shutter 20 is executed at a minimum drive interval that can be set in the digital camera 100, to the above-described default value.

Specifically, in a state in which the digital camera 100 is under the expected maximum environmental temperature and the temperature of the shutter drive device 21 is at the saturation temperature Ts, in a case where mechanical shutter 20 is continuously driven at the above-described minimum drive interval, the number of times C1 of the drive of the mechanical shutter 20 until an amount of a temperature increase of the shutter drive device 21 reaches a difference between the saturation temperature Ts and the allowable upper limit temperature Tg can be obtained from a measurement or simulation calculation using a computer. Then, the upper limit value CL of the count value is obtained as a value obtained by adding the number of times C1 of the drive to the above-described default value.

Figure 5:
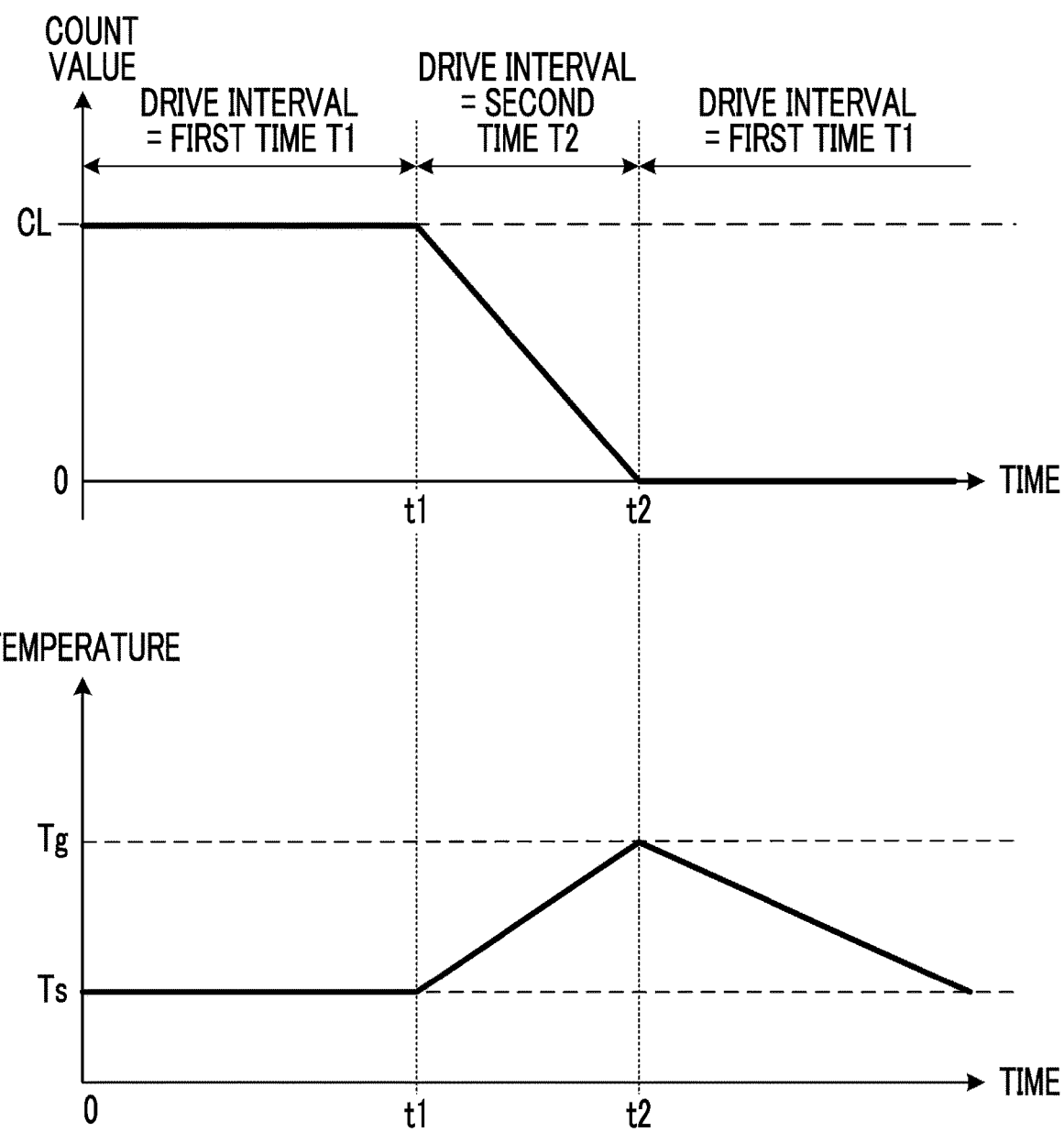
FIG. 5 is a diagram showing an example of change in count value and temperature of the shutter drive device 21 in a state in which the drive of the mechanical shutter 20 is being executed.

FIG. 5 is a diagram showing an example of change in count value and temperature of the shutter drive device 21 in a state in which the drive of the mechanical shutter 20 is being executed. FIG. 5 shows, as an example, a case where, in a state in which the digital camera 100 is under the expected maximum environmental temperature, the temperature of the shutter drive device 21 reaches the saturation temperature Ts, in a state in which the count value is the upper limit value CL, the drive of the mechanical shutter 20 is started at the drive interval of the first time T1, and then, the drive interval is changed to the second time T2 (expected worst case). It is assumed that the second time T2 is the minimum drive interval that can be set in the digital camera 100.

From the reference timing to a timing t1, the drive of the mechanical shutter 20 is executed at the drive interval of the first time T1. For this reason, the count value is maintained at the upper limit value CL, and the temperature of the shutter drive device 21 is also maintained at the saturation temperature Ts. In a case where the drive interval is changed to the second time T2 at the timing t1, the count value starts to decrease from the upper limit value CL and reaches zero at a timing t2. The number of times of the drive of the mechanical shutter 20 that is executed from the timing t1 to the timing t2 is the number of times C1 of the drive. For this reason, the temperature of the shutter drive device 21 increases from the saturation temperature Ts to the allowable upper limit temperature Tg from the timing t1 to the timing t2.

Since the count value reaches zero at the timing t2, the processing unit of the controller 60 changes the drive interval to the first time T1 or more (in the example of FIG. 4, the first time T1). For this reason, after the timing t2, fluctuation of the count value is stopped. The temperature of the shutter drive device 21 decreases from the allowable upper limit temperature Tg to be equal to or lower than the saturation temperature Ts with the change of the drive interval to the first time T1 or more.

The upper limit value CL is set for the count value in this way, whereby it is possible to restrain the temperature of the shutter drive device 21 from being maintained in a state of being equal to or higher than the allowable upper limit temperature Tg even in a case where the drive of the mechanical shutter 20 is executed at a drive interval shorter than the first time T1.

It is preferable that, in a case where the digital camera 100 is powered off and the digital camera 100 is stopped, the processing unit of the controller 60 stores and holds the count value of the counter in the memory 61, and when the digital camera 100 is started next, starts count-up or count-down from the held count value. In this manner, even in a case where the digital camera 100 is powered on and off frequently, it is possible to restrain the temperature of the shutter drive device 21 from being maintained at the allowable upper limit temperature Tg, and to achieve the protection of the shutter drive device 21.

It is preferable that, in a case where the digital camera 100 is stopped, and in a case where the count value cannot be held, for example, because the digital camera 100 is powered off before the count value is stored (in a case where the holding of the count value fails), the processing unit of the controller 60 sets the count value of the counter to the above-described default value when the digital camera 100 is started next. In this manner, it is possible to secure the continuity of the control of the drive interval for protecting the shutter drive device 21.

In a case where the digital camera 100 is stopped and the count value is held at a first point in time, and then, the digital camera 100 is started at a second point in time, the processing unit of the controller 60 digital camera 100 may update the count value by adding, to the held count value, a quotient obtained by dividing a time from the first point in time to the second point in time by the first time T1 after the digital camera 100 is started. In this way, the count value that will increase in a period during which the digital camera 100 is powered off increases when the digital camera 100 is started, whereby it is possible to restrain the continuous shooting speed from being limited more than necessary.

Figure 6:
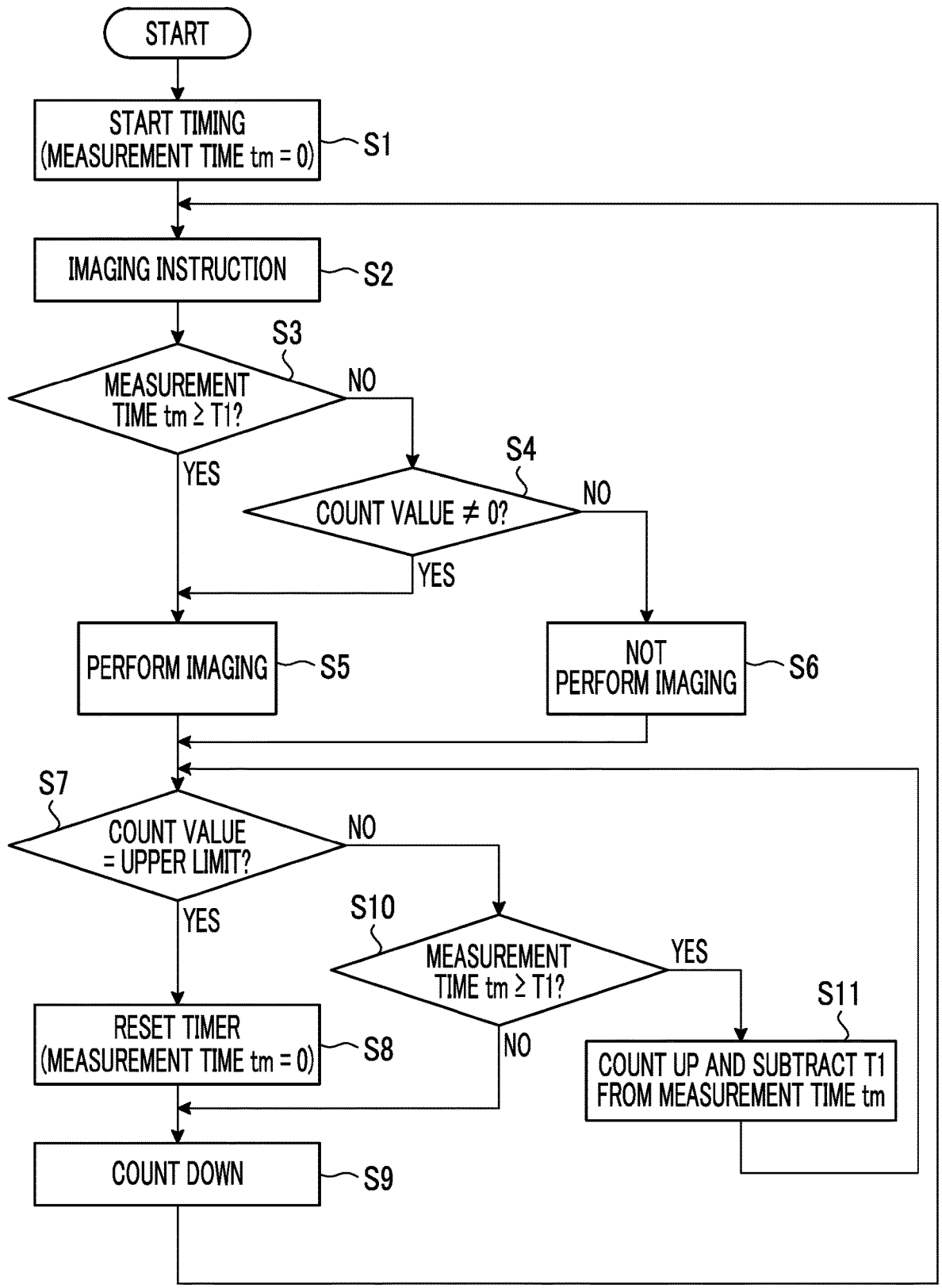
FIG. 6 is a flowchart illustrating a preferred example of an operation of the processing unit of the controller 60.

FIG. 6 is a flowchart illustrating a preferred example of an operation of the processing unit of the controller 60. Here, description will be provided assuming that the processing unit incorporates a timer that performs timing.

In a case where the digital camera 100 is started, the processing unit of the controller 60 starts timing with the timer (Step S1). A measurement time tm of the timer in Step S1 is 0, and a timing of the measurement time tm=0 is a reference timing. The measurement time tm composes an elapsed time from the reference timing.

After Step S1, in a case where a start instruction (hereinafter, described as an imaging instruction) of one imaging frame of continuous shooting is received (Step S2), the processing unit of the controller 60 determines whether or not the measurement time tm of the timer is equal to or more than the first time T1 (Step S3). In a case where the measurement time tm is equal to or more than the first time T1 (Step S3: YES), the processing unit of the controller 60 executes the drive of the mechanical shutter 20 and the drive of the imaging element 30 through the shutter drive device 21 to perform imaging of the imaging frame corresponding to the start instruction (Step S5).

In a case where the measurement time tm is less than the first time T1 (Step S3: NO), the processing unit of the controller 60 determines whether or not the count value of the counter is the default value (=0) (Step S4). In a case where the count value is not the default value (Step S4: YES), in Step S5, the processing unit of the controller 60 performs imaging of the imaging frame corresponding to the start instruction.

In a case where the count value is the default value (Step S4: NO), the processing unit of the controller 60 does not perform imaging of the imaging frame corresponding to the start instruction (Step S6).

In this way, in a case where the determination of Step S3 is YES, imaging is performed while the count value is not confirmed. This is because, in a case where the measurement time tm is equal to or more than the first time T1, there is a need to increase the count value at least one through the above-described first count processing, and the count value being equal to or more than 1 means that the drive of the mechanical shutter 20 is possible.

On the other hand, in a case where the determination of Step S3 is NO, determination on whether or not the drive of the mechanical shutter 20 is possible cannot be performed only with the measurement time tm. For this reason, in Step S4, the confirmation of the count value is needed.

After any one of Step S5 or Step S6 is performed, the processing unit of the controller 60 determines whether or not the count value reaches the upper limit value CL (Step S7).

The processing of Step S6 is executed only in a case where the count value is 0. For this reason, in a case where the determination of Step S7 is YES, the processing of Step S5 is necessarily executed. Accordingly, in a case where the count value reaches the upper limit value CL (Step S7: YES), the processing unit of the controller 60 resets the measurement time tm of the timer to 0 to change a timing at which the processing of Step S5 is executed, to the reference timing (Step S8). Then, the processing unit of the controller 60 executes the second count processing based on the execution of the drive of the mechanical shutter 20 through the imaging of Step S5 to decrease the count value by "1" (Step S9). Then, the processing unit of the controller 60 returns the process to Step S2 and waits for a start instruction of a next imaging frame.

In a case where the count value does not reach the upper limit value CL (Step S7: NO), the processing unit of the controller 60 determines whether or not the measurement time tm of the timer is equal to or more than the first time T1 (Step S10). In a case where the measurement time tm of the timer is equal to or more than the first time T1, there is a need to increase the count value through the first count processing depending on the measurement time tm. For this reason, in a case where the measurement time tm of the timer is equal to or more than the first time T1 (Step S10: YES), the processing unit of the controller 60 repeats processing of increasing the count value of the counter by "1" and subtracting the first time T1 from the measurement time tm of the timer (Step S11), and returning the process to Step S7 until the count value reaches the upper limit value CL or the measurement time tm is less than the first time T1.

In a case where the measurement time tm of the timer is less than the first time T1 (Step S10: NO), the processing unit of the controller 60 executes the processing of Step S9.

Even in a case where the processing of any one of Step S5 or Step S6 is executed, a state in which the determination of Step S7 is NO and the determination of Step S10 is NO can be brought. On the contrary, in a case where the determination of Step S4 is NO (that is, the count value is 0), Step S6 is performed, and the determination of Step S7 is NO and the determination of Step S10 is NO, since the count value is already 0, the count value is not decreased through Step S9. That is, Step S9 that is performed in a case where Step S6 is performed can be replaced with a step in which the second count processing of decreasing the count value with the drive of the mechanical shutter 20 is not executed.

On the other hand, in a case where the processing of Step S5 is executed, the determination of Step S7 is NO and the determination of Step S10 is NO, the count value is necessarily 1 or more. For this reason, in Step S9, the count value is decreased. That is, Step S9 that is performed after Step S5 is performed is the second count processing of decreasing the count value with the drive of the mechanical shutter 20.

The operation shown in FIG. 6 will be described in detail with specific numerical values as an example. For example, a case where the drive interval is changed from the second time T2=1/60 seconds to the first time T1=1/30 seconds is taken as an example. Here, a state in which the counter value is the upper limit value CL (for example, set to 3) is taken as an example.

<First Imaging Frame>

In a case where there is the imaging instruction of Step S2 in a state of the measurement time tm=1/60 seconds, the determination of Step S3 is NO, the determination of Step S4 is YES, and imaging of a first imaging frame is performed. Then, the determination of Step S7 is YES, the measurement time tm is reset to 0 in Step S8, the count value is changed to "2" in Step S9, and the process returns to Step S2.

<Second Imaging Frame>

In a case where there is the imaging instruction of Step S2 in a state of the measurement time tm=1/60 seconds, the determination of Step S3 is NO, the determination of Step S4 is YES, and imaging of a second imaging frame is performed. Then, since the determination of Step S7 is NO and the determination of Step S10 is NO, the count value is changed to "1" in Step S9, and the process returns to Step S2.

<Third Imaging Frame>

In a case where there is the imaging instruction of Step S2 in a state of the measurement time tm=1/30 seconds, the determination of Step S3 is YES, and imaging of a third imaging frame is performed. Then, the determination of Step S7 is NO, the determination of Step S10 is YES, and in Step S11, the measurement time tm=0 and the count value is changed to "2". Thereafter, the determination of Step S7 is NO, the determination of Step S10 is NO, the count value is changed to "1" in Step S9, and the process returns to Step S2.

<Fourth Imaging Frame>

In a case where there is the imaging instruction of Step S2 in a state of the measurement time tm=1/60 seconds, the determination of Step S3 is NO, the determination of Step S4 is YES, and imaging of a fourth imaging frame is performed. Then, since the determination of Step S7 is NO and the determination of Step S10 is NO, the count value is changed to "0" in Step S9, and the process returns to Step S2.

<Fifth Imaging Frame>

In a case where there is the imaging instruction of Step S2 in a state of the measurement time tm=1/30 seconds, the determination of Step S3 is YES, and imaging of a fifth imaging frame is performed. Then, the determination of Step S7 is NO, the determination of Step S10 is YES, and in Step S11, the measurement time tm=0 and the count value is changed to "1". Thereafter, the determination of Step S7 is NO, the determination of Step S10 is NO, the count value is changed to "0" in Step S9, and the process returns to Step S2.

<Sixth Imaging Frame>

In a case where there is the imaging instruction of Step S2 in a state of the measurement time tm=1/60 seconds, the determination of Step S3 is NO, the determination of Step S4 is NO, and imaging of a sixth imaging frame is not performed. Then, since the determination of Step S7 is NO and the determination of Step S10 is NO, the count value is maintained at "0" in Step S9, and the process returns to Step S2.

Subsequently, the processing of <Fifth Imaging Frame> and the processing of <Sixth Imaging Frame> are alternately repeated. In this way, until the count value immediately before the imaging instruction is received in Step S2 is 0 (from the first imaging frame to the fourth imaging frame), the drive of the mechanical shutter 20 is executed every 1/60 seconds, and in a case where the count value immediately before the imaging instruction is received in Step S2 is 0, the drive of the mechanical shutter 20 is executed every 1/30 seconds.

With the operation shown in FIG. 6, in a case where the drive timing of the mechanical shutter 20 is reached (the timing of Step S2), determination is made whether or not to execute the drive of the mechanical shutter 20 (that is, imaging) based on the measurement time tm and the count value, and the count value is changed after the determination. In this way, the counter value is updated depending on an elapsed time after the digital camera 100 is started or an elapsed time after imaging of a previous imaging frame is performed, whereby the processing unit of the controller 60 does not need to constantly monitor the counter. Accordingly, it is possible to reduce a load on the processing unit of the controller 60.

As described above, with the digital camera 100, it is possible to manage the count value based on information regarding the first time T1, the elapsed time from the reference timing, and the presence or absence of the execution of the drive of the mechanical shutter 20, and to control the drive interval of the mechanical shutter 20 to an appropriate value using the count value. With this configuration, since there is no need to finely store drive results of the mechanical shutter 20, it is possible to achieve the protection of the shutter drive device 21 with simple control. Since a temperature sensor for detecting the temperature of the shutter drive device 21 is not required, it is possible to realize a reduction in size and a reduction in cost of the digital camera 100.

In particular, although the coil that is used in the shutter of the imaging apparatus may be formed by winding a conductive wire in multiple turns, in a case where the shutter is continuously driven, rapid heat generation of the coil is caused for a short time, the inside of the coil wound in multiple turns is instantaneously heated to a higher temperature than the outside, and it is hard to measure the temperature of the inside of the coil in real time, the invention is useful in even such a case.

MODIFICATION EXAMPLES

The above-described default value is not limited to zero and can have any value. A configuration may be made in which the first count processing is changed to processing of decreasing the count value and the second count processing is changed to processing of increasing the count value.

The imaging optical system 10 and the optical system drive device 11 may be configured into a unit to be attachable and detachable to a body part of the digital camera 100 including the controller 60, the imaging element 30, the imaging element drive device 31, the image processing unit 40, and the display 50. Although the digital camera 100 has been described as an example of the imaging apparatus, the technique of the embodiment can also be applied to a smartphone.

As described above, at least the following matters are disclosed in the specification.

(1)

A shutter control device that controls a drive device for a mechanical shutter included in an imaging apparatus, the shutter control device comprising a processor that sets, as a first time, a value determined based on characteristics of the drive device and an allowable upper limit temperature of the drive device among drive intervals of the mechanical shutter in a case where the mechanical shutter is continuously driven with the drive device and controls a drive interval of the mechanical shutter based on information regarding the first time and an elapsed time from a reference timing.

(2)

The shutter control device described in (1), in which the first time is a drive interval of the mechanical shutter at which a temperature of the drive device is made to be saturable at a saturation temperature lower than the allowable upper limit temperature in a case where the mechanical shutter is continuously driven with the drive device.

(3)

The shutter control device according to (2), in which the processor executes first count processing of increasing or decreasing a count value in a case where a predetermined time has elapsed from the reference timing and second count processing of increasing or decreasing the count value reversely to the first count processing in a case where the drive of the mechanical shutter is executed, and in a state in which a second time shorter than the first time is set as the drive interval and the count value is a default value, the drive interval is changed from the second time to a time equal to or more than the first time.

(4)

The shutter control device according to (3), in which the first count processing is processing of changing the count value by N that is a natural number equal to or greater than 1 in a case where a time of N times the first time has elapsed from the reference timing, and in a state in which the second time is set as the drive interval, the count value is the default value, and a timing at which the drive of the mechanical shutter is necessary is reached, the processor changes the drive interval from the second time to a time equal to or more than the first time.

(5)

The shutter control device according to (4), in which the first count processing is count-up processing of increasing the count value, the second count processing is count-down processing of decreasing the count value, and an upper limit value is set for the count value.

(6)

The shutter control device according to (5), in which the upper limit value is a value obtained by adding, to the default value, the number of times of the drive of the mechanical shutter necessary for increasing the temperature of the drive device from the saturation temperature to the allowable upper limit temperature in a case where the drive of the mechanical shutter is executed at a settable minimum drive interval.

(7)

The shutter control device according to any one of (3) to (6), in which the processor holds the count value even in a state in which an apparatus including the shutter control device is stopped.

(8)

The shutter control device according to (7), in which the processor sets the count value to the default value after the apparatus is started in a case where the holding of the count value fails.

(9)

The shutter control device according to (7) or (8), in which the processor updates the count value by adding, to the held count value, a quotient obtained by dividing a time from a first point in time at which the apparatus is stopped to a second point in time at which the apparatus is started, by the first time, after the apparatus is started.

(10)

The shutter control device according to any one of (3) to (9), in which the processor determines whether or not to execute the drive of the mechanical shutter based on the elapsed time and the count value in a case where a drive timing of the mechanical shutter is reached, and changes the count value after the determination.

(11)

A shutter unit comprising the shutter control device according to any one of (1) to (10), and the mechanical shutter.

(12)

An imaging apparatus comprising the shutter control device according to any one of (1) to (10).

(13)

A shutter control method that controls a drive device for a mechanical shutter included in an imaging apparatus, the shutter control method comprising a control step of setting, as a first time, a value determined based on characteristics of the drive device and an allowable upper limit temperature of the drive device among drive intervals of the mechanical shutter in a case where the mechanical shutter is continuously driven with the drive device and controls a drive interval of the mechanical shutter based on information regarding the first time and an elapsed time from a reference timing.

(14)

The shutter control method according to (13), in which the first time is a drive interval of the mechanical shutter at which a temperature of the drive device is made to be saturable at a saturation temperature lower than the allowable upper limit temperature in a case where the mechanical shutter is continuously driven with the drive device.

(15)

The shutter control method according to (14), in which, in the control step, first count processing of increasing or decreasing a count value in a case where a predetermined time elapses from the reference timing and second count processing of increasing or decreasing the count value reversely to the first count processing in a case where the drive of the mechanical shutter is executed are executed, and, in a state in which a second time shorter than the first time is set as the drive interval and the count value is a default value, the drive interval is changed from the second time to a time equal to or more than the first time.

(16)

The shutter control method according to (15), in which the first count processing is processing of changing the count value by N that is a natural number equal to or greater than 1 in a case where a time of N times the first time has elapsed from the reference timing, and in the control step, in a state in which the second time is set as the drive interval, the count value is the default value, and a timing at which the drive of the mechanical shutter is necessary is reached, the drive interval is changed from the second time to a time equal to or more than the first time.

(17)

The shutter control method according to (16), in which the first count processing is count-up processing of increasing the count value, the second count processing is count-down processing of decreasing the count value, and an upper limit value is set for the count value.

(18)

The shutter control method according to (17), in which the upper limit value is a value obtained by adding, to the default value, the number of times of the drive of the mechanical shutter necessary for increasing the temperature of the drive device from the saturation temperature to the allowable upper limit temperature in a case where the drive of the mechanical shutter is executed at a settable minimum drive interval.

(19)

The shutter control method according to any one of (15) to (18), in which, in the control step, the count value is held even in a state in which an apparatus that executes the shutter control method is stopped.

(20)

The shutter control method according to (19), in which, in the control step, in a case where the holding of the count value fails, the count value is set to the default value after the apparatus is started.

(21)

The shutter control method according to (19) or (20), in which, in the control step, the count value is updated by adding, to the held count value, a quotient obtained by dividing a time from a first point in time at which the apparatus is stopped to a second point in time at which the apparatus is started, by the first time, after the apparatus is started.

(22)

The shutter control method according to any one of (15) to (21), in which, in the control step, determination is made whether or not to execute the drive of the mechanical shutter based on the elapsed time and the count value in a case where a drive timing of the mechanical shutter is reached, and the count value is changed after the determination.

(23)

A shutter control program that controls a drive device for a mechanical shutter included in an imaging apparatus, the shutter control program causing a computer to execute a control step of setting, as a first time, a value determined based on characteristics of the drive device and an allowable upper limit temperature of the drive device among drive intervals of the mechanical shutter in a case where the mechanical shutter is continuously driven with the drive device and controls a drive interval of the mechanical shutter based on information regarding the first time and an elapsed time from a reference timing.

Although various embodiments have been described referring to the drawings, it is needless to say that the present invention is not limited to such examples. It is obvious that those skilled in the art can conceive various changes or modifications within the scope described in the claims, and naturally, such changes or modifications also belong to the technical scope of the present invention. The components in the above-described embodiments may be optionally combined without departing from the spirit of the present invention.

The present application is based on Japanese patent application filed on Nov. 29, 2019 (JP2019-217409), the content of which is incorporated herein by reference.

EXPLANATION OF REFERENCES

CH1, CH2, CH3: temperature change
10: imaging optical system
11: optical system drive device
20: mechanical shutter
21: shutter drive device
30: imaging element
31: imaging element drive device
40: image processing unit
50: display
60: controller
61: memory
100: digital camera
Lu, Ld, Lc, Lda: straight line

What is claimed is:

1. A shutter control device that controls a drive device for a mechanical shutter included in an imaging apparatus, the shutter control device comprising:
a processor configured to control a drive interval of the mechanical shutter in a case where the mechanical shutter is continuously driven by the drive device, wherein
the processor is configured to:
set, as a first time, a drive interval of the mechanical shutter at which a temperature of the drive device is made to be saturable at a saturation temperature lower than an allowable upper limit temperature in a case where the mechanical shutter is continuously driven by the drive device; and
control a drive interval of the mechanical shutter based on a comparison between an elapsed time from a reference timing and a number of times of the mechanical shutter being driven during the elapsed time, the elapsed time being calculated by a unit of the first time.

2. The shutter control device according to claim 1,
wherein the processor is configured to execute first count processing of increasing or decreasing a count value in a case where a predetermined time elapses from the reference timing and second count processing of increasing or decreasing the count value reversely to the first count processing in a case where the drive of the mechanical shutter is executed, and
in a state in which a second time shorter than the first time is set as the drive interval and the count value is a default value, the drive interval is changed from the second time to a time equal to or more than the first time.

3. The shutter control device according to claim 2,
wherein the first count processing is processing of changing the count value by N that is a natural number equal to or greater than 1 in a case where a time of N times the first time has elapsed from the reference timing, and
in a state in which the second time is set as the drive interval, the count value is the default value, and a timing at which the drive of the mechanical shutter is needed is reached, the processor changes the drive interval from the second time to a time equal to or more than the first time.

4. The shutter control device according to claim 3, wherein the first count processing is count-up processing of increasing the count value,
the second count processing is count-down processing of decreasing the count value, and
an upper limit value is set for the count value.

5. The shutter control device according to claim 4, wherein the upper limit value is a value obtained by adding, to the default value, a number of times of the drive of the mechanical shutter needed for increasing the temperature of the drive device from the saturation temperature to the allowable upper limit temperature in a case where the drive of the mechanical shutter is executed at a settable minimum drive interval.

6. The shutter control device according to claim 2, wherein the processor holds the count value even in a state in which an apparatus including the shutter control device is stopped.

7. The shutter control device according to claim 6, wherein the processor sets the count value to the default value after the apparatus is started in a case where the holding of the count value fails.

8. The shutter control device according to claim 6, wherein the processor updates the count value by adding, to the held count value, a quotient obtained by dividing a time from a first point in time at which the apparatus is stopped to a second point in time at which the apparatus is started, by the first time, after the apparatus is started.

9. The shutter control device according to claim 2, wherein the processor determines whether or not to execute the drive of the mechanical shutter based on the elapsed time and the count value in a case where a drive timing of the mechanical shutter is reached, and changes the count value after the determination.

10. A shutter unit comprising:
the shutter control device according to claim 1; and
the mechanical shutter.

11. An imaging apparatus comprising:
the shutter control device according to claim 1.

12. A shutter control method that controls a drive device for a mechanical shutter included in an imaging apparatus, the shutter control method comprising:
a control step of setting, as a first time, a drive interval of the mechanical shutter at which a temperature of the drive device is made to be saturable at a saturation temperature lower than an allowable upper limit temperature in a case where the mechanical shutter is continuously driven by the drive device, and controlling a drive interval of the mechanical shutter based on a comparison between an elapsed time from a reference timing and a number of times of the mechanical shutter being driven during the elapsed time, the elapsed time being calculated by a unit of the first time.

13. The shutter control method according to claim 12, wherein, in the control step, first count processing of increasing or decreasing a count value in a case where a predetermined time elapses from the reference timing and second count processing of increasing or decreasing the count value reversely to the first count processing in a case where the drive of the mechanical shutter is executed are executed, and
in a state in which a second time shorter than the first time is set as the drive interval and the count value is a default value, the drive interval is changed from the second time to a time equal to or more than the first time.

14. The shutter control method according to claim 13, wherein the first count processing is processing of changing the count value by N that is a natural number equal to or greater than 1 in a case where a time of N times the first time has elapsed from the reference timing, and
in the control step, in a state in which the second time is set as the drive interval, the count value is the default value, and a timing at which the drive of the mechanical shutter is needed is reached, the drive interval is changed from the second time to a time equal to or more than the first time.

15. The shutter control method according to claim 14, wherein the first count processing is count-up processing of increasing the count value,
the second count processing is count-down processing of decreasing the count value, and
an upper limit value is set for the count value.

16. The shutter control method according to claim 15, wherein the upper limit value is a value obtained by adding, to the default value, a number of times of the drive of the mechanical shutter needed for increasing the temperature of the drive device from the saturation temperature to the allowable upper limit temperature in a case where the drive of the mechanical shutter is executed at a settable minimum drive interval.

17. The shutter control method according to claim 13, wherein, in the control step, the count value is held even in a state in which an apparatus that executes the shutter control method is stopped.

18. The shutter control method according to claim 17, wherein, in the control step, in a case where the holding of the count value fails, the count value is set to the default value after the apparatus is started.

19. The shutter control method according to claim 17, wherein, in the control step, the count value is updated by adding, to the held count value, a quotient obtained by dividing a time from a first point in time at which the apparatus is stopped to a second point in time at which the apparatus is started, by the first time, after the apparatus is started.

20. The shutter control method according to claim 13, wherein, in the control step, determination is made whether or not to execute the drive of the mechanical shutter based on the elapsed time and the count value in a case where a drive timing of the mechanical shutter is reached, and the count value is changed after the determination.

21. A non-transitory computer readable medium storing a shutter control program that controls a drive device for a mechanical shutter included in an imaging apparatus, the shutter control program causing a computer to execute:
a control step of setting, as a first time, a drive interval of the mechanical shutter at which a temperature of the drive device is made to be saturable at a saturation temperature lower than an allowable upper limit temperature in a case where the mechanical shutter is continuously driven by the drive device, and controlling a drive interval of the mechanical shutter based on a comparison between an elapsed time from a reference timing and a number of times of the mechanical shutter being driven during the elapsed time, the elapsed time being calculated by a unit of the first time.

* * * * *